United States Patent [19]

Schultz

[11] 4,411,341
[45] Oct. 25, 1983

[54] ROTARY HYDRAULIC DAMPER

[75] Inventor: John C. Schultz, Buffalo, N.Y.

[73] Assignee: Houdaille Industries, Inc., Fort Lauderdale, Fla.

[21] Appl. No.: 244,808

[22] Filed: Mar. 17, 1981

[51] Int. Cl.³ .................. F16F 9/14; F16D 57/02
[52] U.S. Cl. ........................ 188/310; 16/57; 16/58; 192/58 A
[58] Field of Search ......... 188/306, 307, 308, 309, 188/310; 16/57, 58; 192/58 A, 109 D, 58 B, 58 C

[56] References Cited

U.S. PATENT DOCUMENTS

| | | | |
|---|---|---|---|
| 1,072,770 | 9/1913 | Peteler | 16/58 |
| 1,889,354 | 11/1932 | Fieldman | 188/310 |
| 2,027,423 | 1/1936 | Gardiner | 16/58 X |
| 2,194,001 | 2/1940 | Begg | 188/306 |
| 2,334,340 | 11/1943 | Magrum | 188/100 |
| 2,358,988 | 9/1944 | Magrum | 277/54 |
| 2,409,505 | 10/1946 | Magrum | 309/1 |
| 2,722,289 | 11/1955 | Girard | 188/306 |
| 2,845,157 | 7/1958 | Gambell | 192/58 C X |
| 3,363,731 | 1/1968 | Willems | 192/58 C X |
| 3,452,841 | 7/1969 | Shafer | 16/58 A |
| 3,650,359 | 2/1972 | Nash | 16/58 X |
| 3,666,256 | 5/1972 | Ellis et al. | 188/315 X |
| 3,672,475 | 6/1972 | Nash | 188/306 X |
| 3,882,976 | 5/1975 | Nash | 188/306 |
| 4,274,516 | 6/1981 | Barley | 188/310 |
| 4,286,621 | 9/1981 | Glahn | 188/306 X |

FOREIGN PATENT DOCUMENTS 125531  11/1931  Fed. Rep. of Germany ... 192/58 A

Primary Examiner—George E. A. Halvosa
Attorney, Agent, or Firm—Hill, Van Santen, Steadman & Simpson

[57] ABSTRACT

Relative motion between movable parts is damped by way of a hydraulic damper having radial vanes in a hydraulic damping fluid filled working chamber and dividing the chamber into subchambers which respectively increase and decrease in volume in response to torsional movements of the vanes in the working chamber during relative rotation of subassemblies of the damper. Damping is effected by controlled displacement of the hydraulic damping fluid between the subchambers through restricted orifices across an edge of the vanes during torsional movements of the vanes responsive to relative motion of the parts to be damped. Damping may be provided in either direction of rotation. Another level or no damping may be provided in the opposite direction of rotation. Substantially equal damping may be effected in both directions of rotation. A range of adjustments of the restricted orifices is provided for. The damper may be equipped with an overload pressure relief device.

7 Claims, 12 Drawing Figures

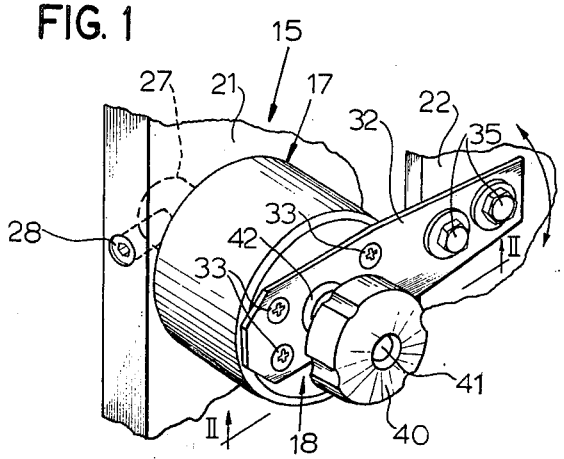
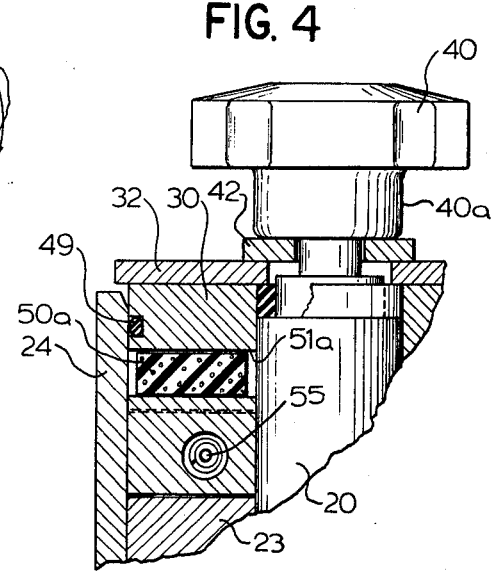
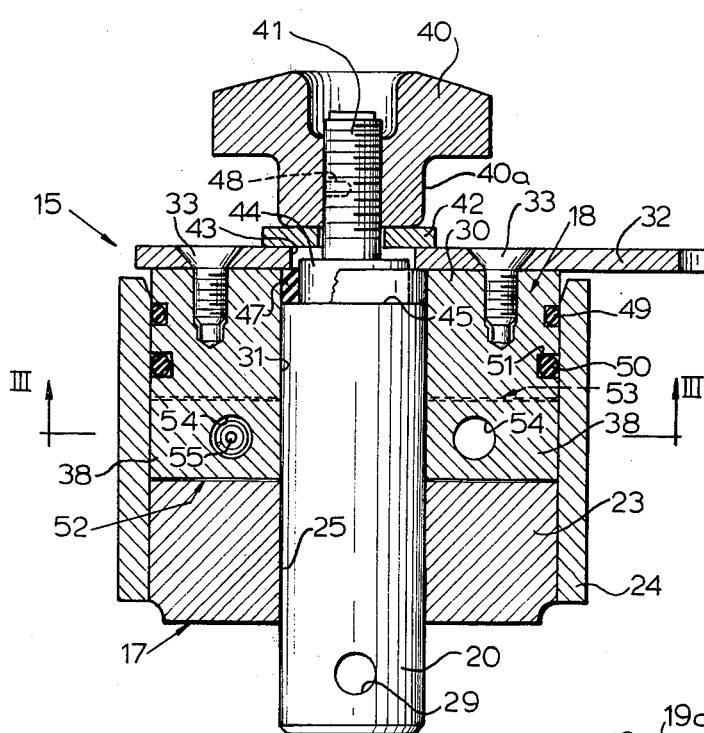
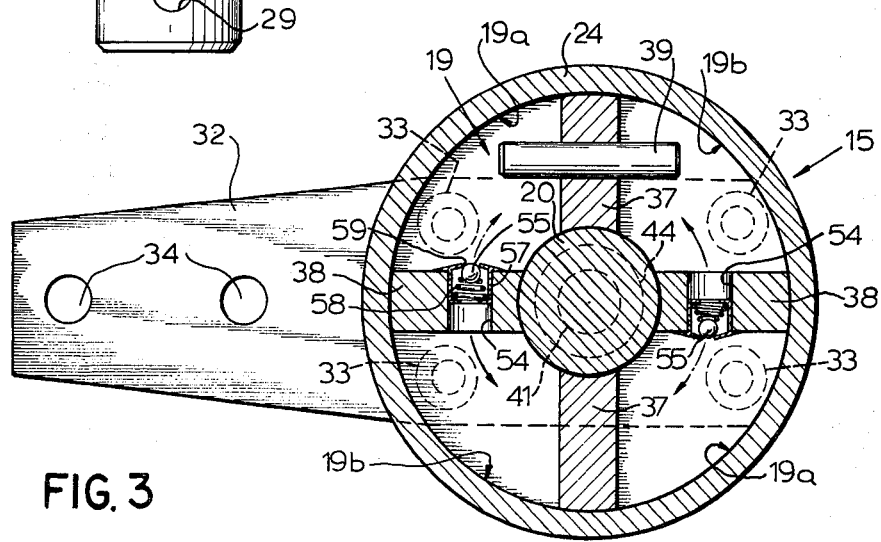

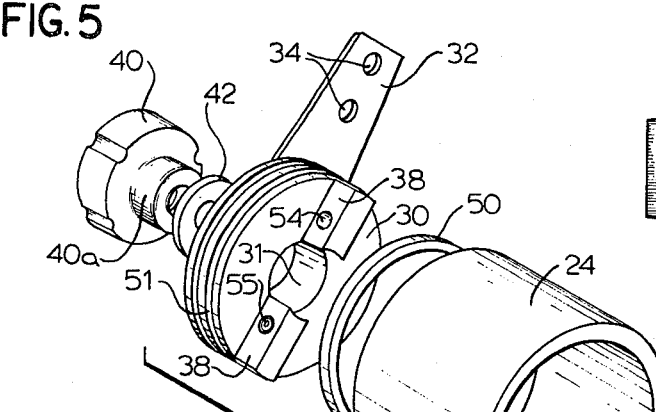
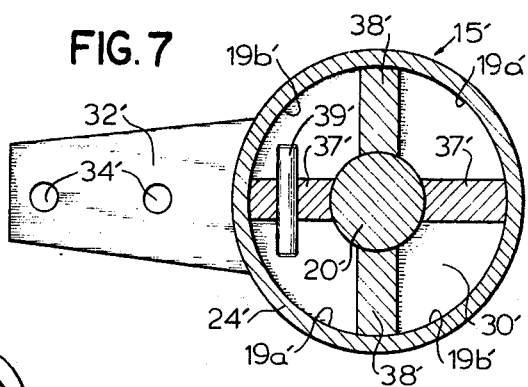
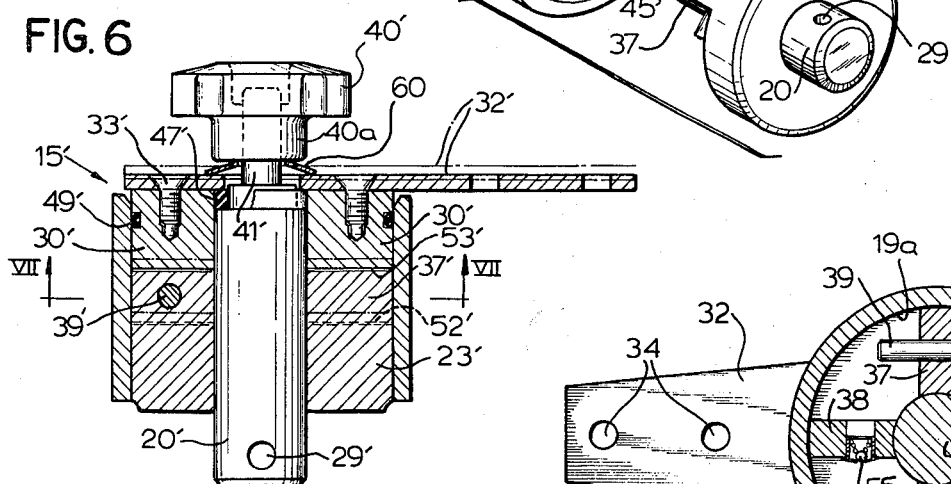
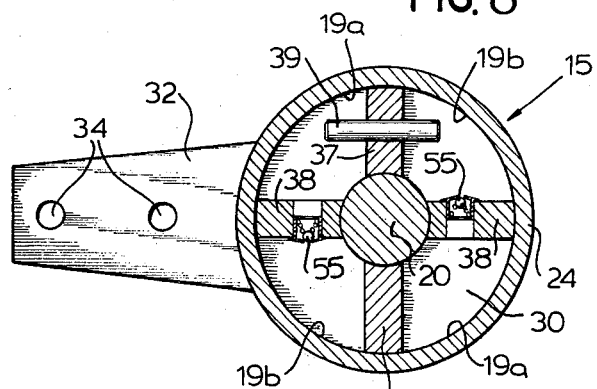
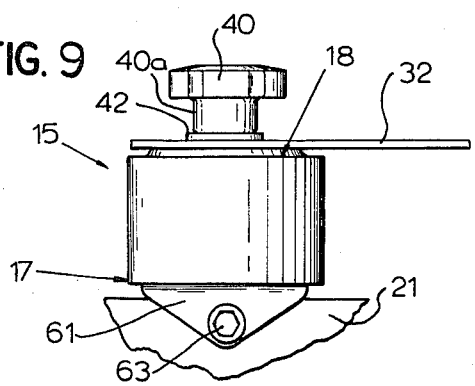
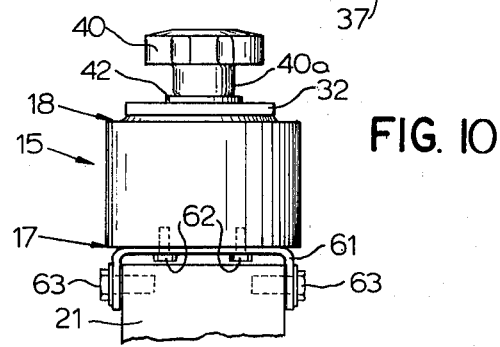
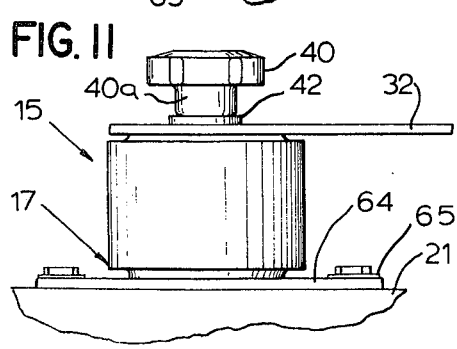
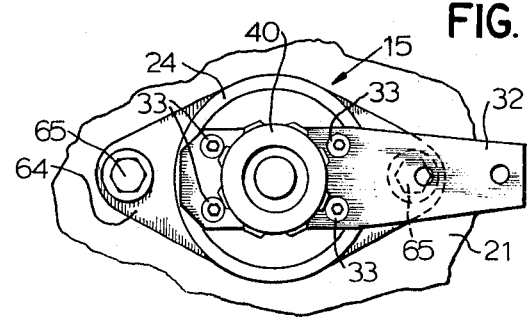

ROTARY HYDRAULIC DAMPER

This invention relates to rotary hydraulic dampers or shock absorbers of the type in which relatively rotary structures, e.g. a rotor and a stator, have radial vane means dividing a hydraulic working chamber into subchambers which vary in volume responsive to relative rotary movements of the rotary structures, and damping is effected by controlled damping displacement of hydraulic fluid between the subchambers.

Dampers of the kind indicated may be of the single vane type or multiple vane type. Higher efficiency and hydraulic balance is attained with the multiple vane type.

Representative examples of multivane rotary hydraulic dampers or shock absorbers are found in U.S. Pat. Nos. 2,334,340; 2,358,988 and 2,409,505. Such dampers or shock absorbers have been especially useful for damping the suspension systems of vehicles. They are designed to accommodate a wide range of temperatures and contain features required to satisfy suspension system behavior. However, it will be observed that the noted dampers require a fairly large number of components, especially in the valving systems, some of which are of intricate, complex shapes. Where high production rates are involved, components of complex shapes, requiring specialized tooling and material may be warranted because the large number of respective pieces will result in reasonable per piece costs.

Sometimes shock absorbers or dampers of this kind for uses other than in vehicles may not require as high a degree of performance characteristics, but due to the unavailability of less complex structures may not be economically adoptable although the functional advantages would be desirable. Where relatively low production is involved, the tooling costs may be prohibitive in situations where such a damper might otherwise be useful.

An important object of the present invention is to provide an economical hydraulic damper or shock absorber of the rotary vane type which avoids complex shape components and lends itself to fairly simple tooling.

Another object of the invention is to provide a rotary vane hydraulic damper which is especially adapted to take advantage of newer viscous damping fluids which are operable throughout a wide temperature range and are less sensitive to temperature variations than older fluids and accommodate increased clearances and tolerances.

A further object of the invention is to provide a new and improved simplified, structurally sound efficient, durable rotary hydraulic damper.

To this end, the present invention provides in a rotary hydraulic damper adapted for connection to and between relatively moveable parts for damping the relative motion of said parts in at least one direction: a stator structure having means for attachment to one of said parts; a rotor structure having means for attachment to the other of said parts; one of said structures being generally cup-shaped and provided with a tubular wall, and the other of said structures being telescopically assembled within said wall in relatively oscillatable and axially adjustable relation; said stator structure having an axially inwardly facing surface provided with axially inwardly projecting integral radial vane means, and said rotor structure having an oppositely axially inwardly facing surface directed toward and substantially axially spaced from said stator structure surface and provided with axially inwardly projecting integral radial vane means; said surfaces defining with said tubular wall a damping fluid filled working chamber, and said vane means cooperating with one another for dividing said working chamber into subchambers; and each of said vane means having axially facing edge which is in restricted width damping orifice gap relation to the structure surface opposite to the surface from which the respective vane means extends, so that in relative rotation of said structures, said damping fluid will be displaced through the damping orifice gaps. Means are provided for effecting relative axial adjustment of the entire stator and rotor structures with respect to one another for thereby adjusting the widths of the damping orifice gaps between each of the vane edges and the confronting axially facing structure surface.

The present invention also provides a method of damping relative motion in at least one direction of relatively moveable parts by means of a rotary hydraulic damper, comprising telescopically assembling in relatively oscillatable and axially adjustable relation a stator structure and a rotor structure; attaching said stator structure to one of said parts; attaching said rotor structure to the other of said parts; defining between respective axially inwardly facing substantially axially spaced apart inner surfaces on said structures and a tubular wall surface of one of said structures a damping fluid filled working chamber; providing restricted gap damping orifices between each of said inner surfaces and axially facing edges of vane means extending axially fixedly from the respective opposite inner surface in each instance and dividing said working chamber into subchambers; and displacing damping fluid through said damping orifices by relative rotation of said structures and corresponding relative swinging of said vane means, responsive to relative movement of said parts. Relatively axial adjustment of the entire rotor and stator structures with respect to one another effects adjustment in the width of the restricted gap damping orifices.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which:

FIG. 1 is a perspective view showing a damper embodying features of the invention;

FIG. 2 is an enlarged diametric sectional detail view taken substantially along the line II—II of FIG. 1;

FIG. 3 is a transverse sectional detail view taken substantially along the line III—III of FIG. 2 but showing the lever member in a 180° reoriented position;

FIG. 4 is a fragmentary sectional detail view similar to FIG. 2 but showing a modification;

FIG. 5 is an exploded assembly view of the damper of FIGS. 1 and 2;

FIG. 6 is a sectional view similar to FIG. 2 but showing another modification;

FIG. 7 is a transverse sectional detail view taken substantially along the line VII—VII of FIG. 6 but showing the attachment lever reoriented 180°;

FIG. 8 is a sectional view similar to FIG. 7 but showing still another modification;

FIGS. 9 and 10 are elevational views showing a modified arrangement for mounting the stator of the damper; and FIGS. 11 and 12 are respectively an elevational view and a plan view showing another arrangement for mounting the stator of the damper.

Referring to FIGS. 1 and 2, a rotary hydraulic damper 15 comprises relatively rotatable structures 17 and 18, e.g. a stator and a rotor, which define a working chamber 19 (FIG. 3) adapted to be substantially filled with hydraulic fluid. The stator structure 17 comprises an assembly having means including a pintle 20 for connection to a part 21 while the rotor structure 18 is adapted to be attached to a part 22. The parts 21 and 22 as shown in FIG. 1 are intended to represent more or less schematically any relatively movable parts, the relative motion of which should be damped in at least one direction of the relative movement.

In a desirable construction, the stator assembly 17 comprises a body member 23 (FIGS. 2 and 5) of preferably cylindrical perimeter fitted into one end portion of a stator cylinder 24. Hermetically sealed fixed securement of stator body 23 in the cylinder 24 may be in any preferred manner, such as press fit, cemented, welded, or any combination of techniques. Centrally, the stator body 23 has a bore 25 through which the pintle, which is preferably cylindrical, extends fixedly. Similarly, as described for the cylinder 24, the pintle 20 may be secured in hermetically sealed fixed relation in the bore 25 as by means of pressfit, by cementing, by welding, or any combination of these techniques. One end portion of the pintle 20 may project a sufficient distance axially outwardly from the stator body 23 to facilitate connection of the damper to the member 21 which for this purpose may have a bore 27 (FIG. 1) within which the pintle terminal is received and releasably bolted or pinned in place by means of a removable fastener 28 which extends through a suitable transverse bore 29 in the outwardly projecting portion of the pintle. If desired the transverse bore 29 may be fitted with a pin and bracket arrangement to allow an oar lock action.

In a simple, efficient construction, the rotor 18 comprises a body 30 of cylindrical perimeter complementary to the inside diameter of the cylinder 24 so as to be received in a sliding fit within the substantial length portion of the cylinder 24 projecting from the stator body 23 in a cup-shaped arrangement. An axial bore 31 in the body 30 slidably receives the substantial length portion of the pintle 20 which extends from the stator body 23 axially within the chamber 19 defined within the cylinder 24 and between the stator body 23 and the rotor body 30. An attachment lever 32 of a length to extend substantially radially beyond the cylinder 24 may be secured to the outer end of the rotor body 30 in a manner to be selectively projectable in diametrically opposite directions. Conveniently, securement of the lever 32 to the body 30 may be effected by means of a plurality of screws 33, substantially as shown. Location of the screws 33 is such that by simply removing the screws the lever 32 can be reversed as to direction and resecured. Means are provided for attaching the lever arm 32 to the member 22, herein comprising longitudinally spaced bolt holes 34 receptive of bolts 35 adapted to secure the lever arm to the member 22.

Respective radial vane means fixed to each the structures 17, 18 and cooperating in interdigitated relation with vane means on the other of such structures in the working chamber 19 divide the chamber into subchambers which respectively increase and decrease in volume in response to torsional movements of the vane means in the working chamber during relative rotation of the structures 17 and 18. In a preferred construction, each of the structures 17 and 18 carries complementary vane means, i.e. the stator body 23 having diametrically aligned vanes 37 which project toward the rotor 30, and the rotor 30 having diametrically aligned vanes 38 which project toward the stator body 23. As best seen in FIG. 3, the vanes 37 and 38 are disposed to be normally separated by 90° from one another and separate the working chamber 19 into diametrically aligned pairs of subchambers 19a and 19b, respectively. At their radially outer ends, the stator vanes 37 are in tight engagement with the inner wall of the cylinder 24. At their radially inner ends, the stator vanes 37 are in tight engagement with the pintle 20. A sliding engagement of the radially outer ends of the rotor vanes 38 with the inner wall of the cylinder 24 and sliding engagement of the radially inner ends of the vanes 38 with the pintle 20 permit relative swivelling or swinging movement of the vanes 38 within the chamber 19. Stop means comprising a stop pin 39 fixedly carried by one of the stator vanes 37 and projecting a desired distance beyond opposite sides of the associated vane, is located to limit the extent of swinging movements of the rotor vanes 38 to a preferred extent to prevent damage in an over-run condition. By having one of the set of vanes, for example, the vanes 37 disposed normal to the axis of the lever arm 32 and in substantially common plane through the axis of the transverse bore 29 through the externally exposed portion of the pintle 20, and location of the rotor vanes 38 aligned with a plane through the axis of the arm 32, desirable functional orientation of the damper 15 with respect to the relatively movable parts 21 and 22 is readily effected without requiring any other indexing means. In other words, the lever arm 32 and the bore 29 may serve as external indexing means for the damper 15.

Although in one preferred arrangement, the housing cylinder 24 is fixed to the stator body 23, the housing cylinder may, if desired, be fixed to the rotor 30. In the latter event, the radially outer ends of the stator vanes will be in slidable engagement with the inner wall of the cylinder 24, while the outer ends of the rotor vanes 38 will be in relatively fixed engagement with the inner cylinder wall. With either arrangement, function of the damper will be the same.

Before assembly of the stator and rotor structures 17 and 18, the chamber 19 may be filled with the necessary volume of hydraulic fluid of desired viscosity, and which may be a silicone fluid which will maintain stability throughout the range of temperatures that may be encountered in the useful service of the damper 15. Assembly of the stator 17 and the rotor 18 is then effected by receiving the rotor 18 axially within the housing cylinder 24 where such cylinder is fixed to the stator body 23, or by receiving the stator body 23 within the housing cylinder 24 where the housing cylinder is fixed to the rotor body 30. A filled system will thus be achieved.

Securement of the stator 17 and the rotor 18 in assembly is effected by means of a digitally manipulatable knob 40 which is threadedly engaged with an axial terminal 41 projecting rigidly from the end of the pintle 20 which extends outwardly beyond the rotor body 30. A hub 40a on the knob 40 engages a thrust washer 42 concentric with the terminal 41 and thrusts the washer 42 slidably against the butt end portion of the lever arm 32 which has an aperture 43 of smaller diameter than an annular integral collar 44 intermediate the body of the pintle 20 and the threaded terminal 41. This defines an axially outwardly stepped annular shoulder 45 on which is engaged a sealing ring 47 effecting a seal against leakage of damping fluid past the pintle 20. The ring 47 engages the collar 44, the shoulder 45, the wall defining the outer end of the bore 31 and the overhanging portion of the member 32 about the clearance opening 43. Any desired torsionally adjusted position of the knob 40 on the terminal 41 is releasably maintained by means of a nylon or similar friction thread lock plug 48 mounted in a suitable recess in the terminal. Leakage past the rotor body 30 is avoided by means of an O-ring seal 49 desirably carried by the rotor body 30.

Accumulator means are provided to accept thermal expansion of the damping medium hydraulic fluid. In one desirable arrangement, the accumulator means comprises (FIGS. 2 and 5) an annular closed cell elastomer ring 50 carried in an annular groove 51 of complementary size and located axially inwardly spaced from the leak seal 49.

Instead of an annular accumulator, an accumulator body 50a as shown in FIG. 4, may be employed. The body 50a is received in a radial accumulator chamber bore 51a in the rotor body 30 axially inwarly spaced from the seal ring 49 and exposed at either end to the sliding joint between the housing cylinder 24 or the pintle 20, or both.

According to the present invention, hydraulic damping is effected by controlling damping displacement of hydraulic damping fluid between axially opposite ends of the subchambers 19a and 19b through restricted orifice means. However, instead of valve restrictions as has been common practice heretofore, the damping is effected by controlling damping displacement of the hydraulic fluid through restricted orifice means across an edge of the vane means. This is achieved by, for example, leaving a suitable orifice gap 52 between the axially facing edges of the rotor vanes 38 and the opposing planar axially inwardly facing surface of the stator member 23. Also a similar orifice gap arrangement 53 is provided between the axially facing edges of the stator vanes 37 and the opposing planar axially inner surface of the rotor 30. In FIG. 2 the gap 53 is illustratively illustrated out of proper context but to show that both sets of the vanes 37 and 38 have similar orifice gaps between their axial edges and the respectively associated opposing surface areas within the working chamber 19. The precise gap width for each of the gaps 52 and 53 is predetermined by means of the knob 40 which is turned against the thrust washer 42 until the desired gap relationship is achieved as determined by the damping resistance required. Damping resistance may be calibrated at the factory and suitable calibrations provided in association with the knob 40, as for example on the knob and on the outer end of the pintle terminal 41. Therefore, in the field the desired damping resistance can be at least initially set according to the calibration indexing. However, infinitely variable adjustment within a substantial range is attainable by simply turning the knob 40 to thrust the restricted orifice surfaces closer together or to back them off. Thereby, the orifice arrangement is variably adjustable to meet a substantial range of damping requirements.

It will be apparent that as the stator and rotor are relatively rotated by the relative motion of the parts 21 and 22 to which they are respectively connected, the hydraulic damping fluid in the twin subchambers 19a or in the twin subchambers 19b will be displaced in substantially equal, stable relation at each end of the subchamber by vane action into the other of the twin subchambers. That is, when the volume in the subchambers 19a is contracted, the volume in the subchambers 19b is correspondingly expanded, and the hydraulic fluid is forceably displaced through the restricted orifices 52 and 53 from the subchambers 19a into the subchambers 19b. Reversal of relative rotation of the rotor and stator will, of course, contract the subchambers 19b and effect displacement of hydraulic fluid to the subchambers 19a.

For some installations, it may be desirable to provide for hydraulic damping in one relative rotary direction and relatively free travel in the opposite rotary direction. For this purpose, check valve means may be provided in respect to certain of the damper vanes, as for example in FIGS. 2 and 3 in the rotor vanes 38 which for this purpose are provided with respective through bores 54, each equipped with a check valve 55 conveniently in the form of a ball valve housed within a cage 57 fixed in the associated bore 54 and within which the ball valve is biased as by means of a coil compression spring 58 toward a check valve port 59. In the illustrated instance, the check valve ports 59 open toward the subchambers 19a, while the opposite ends of the cages 58 open freely toward the subchambers 19b. As a result, when the subchambers 19a contract as indicated by the dash arrows in FIG. 3, hydraulic fluid from the subchambers 19a is relatively freely displaced into the expanding subchambers 19b. Upon reversal of the relative rotary motion and swinging of the vanes 38 in the rotary direction to contract the subchambers 19b and expand the subchambers 19a, the check valves 55 will prevent displacement of hydraulic fluid through the ports 54 and compel displacement through the restricted damping orifice slots 52 and 53 across the axial edges of the vanes.

Should it be desired to reverse the damping effect, the arrangement shown in FIG. 8 may be employed, wherein the check valves 55 are reversed so that damping is effected upon contraction of the subchambers 19a, while relatively free return is permitted by displacement of hydraulic fluid from the contracting subchambers 19b into the expanding subchambers 19a.

Where hydraulic damping is required in both directions of relative rotation of the stator and rotor, the arrangement depicted in FIGS. 6 and 7 may be employed wherein both the stator vanes 37' and the rotor vanes 38' are solid, so that hydraulic fluid displaced either from the subchambers 19a' into the subchambers 19b' or reversely from the subchambers 19b' to the subchambers 19a' must pass through the restricted damping orifices 52' and 53'. In other respect the damper 15' is substantially the same as the damper 15 and corresponding primed reference characters identify the same parts.

A difference that does appear in FIG. 6 is that an excess pressure relief device is provided. To this end, instead of the flat rigid thrust washer of FIGS. 2 and 5, a bowed spring washer 60 is provided between the hub 40a' of the knob 40' and the butt end portion of the lever arm 32'. Through this arrangement, substantially the same variable orifice adjustment can be attained, but when there is a significant overload, the rotor and stator are adapted to separate a limited distance as indicated in dot dash outline to provide momentary pressure relief by expansion of the orifices 52' and 53'. Instantly as the excess pressure is relieved, the spring washer 60 returns the rotor and stator to normal restricted damping orifice relation having regard to the orifices 52' and 53'. If preferred, either of the forms of accumulator 50 (FIG. 2) or 50a (FIG. 4) may be employed in the damper 15', or as shown, where circumstances permit, the damper 15' may be free of an accumulator. By the same token, the damper 15 may, if circumstances permit, be free of an accumulator.

Different means for mounting the stator 17 on the member 21 may be provided, instead of the axial projection of the pintle 20 from the outer end of the stator. To this end, as shown in FIGS. 9 and 10, a generally U-shaped bracket 61 may be secured as by means of screws 62 to the outer end of the stator and straddle the member 21 to which side wings of the bracket 61 are secured as by means of bolts 63. Attachment of the rotor 18 to a relatively movable member, such as the member 22 of FIG. 1, may be in the same fashion as described in FIG. 1.

Another mode of attachment of the stator 17 may be by means of a mounting base plate 64 (FIGS. 11 and 12) which is secured in any suitable fashion to the outer end of the stator, for example by means of countersunk head bolts in similar fashion as in FIG. 10, but the plate 54 may be flat and have projecting ears or arms as best seen in FIG. 12 which are secured as by means of bolts 65 to the part 21 to which the rotor is thereby attached. There may, of course, be other desirable means for attaching the stator to the part onto which it must be mounted.

From the foregoing, it will be apparent that the damper of the present invention is adapted to be made from an assembly of simple castings, tubing and stamped parts, rod stock, molded elastomer parts, simple check valves and seals. Machining, where necessary, is adapted to be effected simply and fairly routinely. Assemblying of the damper components is simple and easy. The relatively simple, rugged and efficiently cooperative assembly of parts assures effective, trouble-free operation of the damper. Easy adjustment to meet a range of fairly critical operating requirements is provided for. This low cost damper is adapted for a wide range of size as well as performance requirements. The damper is serviceable using simple tools.

It will be understood that variations and modifications may be effected without departing from the spirit and scope of the novel concepts of this invention.

I claim as my invention:

1. In a rotary hydraulic damper adapted for connection to and between relatively moveable parts for damping the relative motion of said parts in at least one direction:
    a stator structure having means for attachment to one of said parts;
    a rotor structure having means for attachment to the other of said parts;
    one of said structures being generally cup-shaped and provided with a tubular wall, and the other of said structures being telescopically assembled within said wall in relatively oscillatable and axially adjustable relation;
    said stator structure having an axially inwardly facing surface provided with axially inwardly projecting integral radial vane means, and said rotor structure having an opposite axially inwardly facing surface directed toward and substantially axially spaced from said stator structure surface and provided with axially inwardly projecting integral radial vane means;
    said surfaces defining with said tubular wall a damping fluid filled working chamber, and said vane means cooperating with one another in interdigitated relation for dividing said working chamber into subchambers which have axially opposite ends at said surfaces;
    each of said vane means having an axially facing edge which is in restricted width damping orifice gap relation to the axially inwardly facing structure surface opposite to the surface from which the respective vane means extends, so that in relative rotation of said structures, said damping fluid will be displaced through the damping orifice gaps at each of said surfaces and each of said subchamber ends;
    means for effecting axial adjustment of the entire stator structure and the entire rotor structure relative to one another for thereby adjusting the widths of said damping orifice gaps between each of said vane means edges and the confronting axially facing structure surface;
    said means for effecting relative axial adjustment comprising an axially projecting pintle rigid with one of said structures and extending through said working chamber and relatively rotatably through the other of said structures and having a portion projecting beyond said other of said structures;
    and a manually operable adjustment knob threaded on said projecting portion and thrusting toward said other of said structures;
    so that by having the orifice gap widths substantially equal between each of said surfaces and said vane means edges, damping fluid displacement in substantially equally divided stable relation is adapted to be attained at both ends of said subchambers.

2. A rotary hydraulic damper according to claim 1, wherein said other of said structures has a transverse bore therein communicating with said chamber, and pressure-responsive compressible closed-cell elastomer acummulator means in said bore.

3. A rotary hydraulic damper according to claim 1, wherein said structure which is telescopically assembled within said wall has an outer end, a lever arm comprising means for attachment to the relatively moveable part associated with said telescopically assembled structure, and means for securing said lever arm in selectively diametrically reversible positions on said outer end of said telescopically assembled structure.

4. A rotary hydraulic damper according to claim 1, wherein said generally cup-shaped structure carries a bracket for attachment to the relatively moveable part associated therewith.

5. A method of damping relative motion in at least one direction of relatively moveable parts by means of a rotary hydraulic damper, comprising:
    telescopically assembling in relatively oscillatable and axially adjustable relation a stator structure and a rotor structure;
    attaching said stator structure to one of said parts;
    attaching said rotor structure to the other of said parts;
    defining between respective axially inwardly facing substantially axially spaced apart inner surfaces on said structures and a tubular wall surface of one of said structures a damping fluid filled working chamber;

providing restricted width gap damping orifices between each of said axially facing inner surfaces and respective axially oppositely facing edges of interdigitated vane means which extend axially fixedly from the respective opposite inner surface in each instance and divide said working chamber into subchambers having opposite ends;

displacing damping fluid through said damping orifices at both of said axially facing inner surfaces and thereby at both of the opposite ends of said subchambers by relative rotation of said structures and corresponding relative swinging of said vane means, responsive to relative movement of said parts, so that, by arranging the width of the orifice gaps substantially equally between each of said surfaces and said vane means edges, attaining damping fluid displacement in substantially equally divided stable relation at opposite ends of said subchambers;

relatively axially adjusting said rotor and stator structures with respect to one another and thereby effecting adjustment in the width of said restricted gap damping orifices;

and normally biasing said structures relatively axially toward one another into adjusted damping orifice width relation, and when an overload condition arises in said chamber overcoming the bias for thereby increasing the width of said damping orifices for relieving the overload condition.

6. In a method of damping relation motion between relatively moveable parts by means of a hydraulic damper having a stator structure and a rotor structure defining a working chamber adapted to be substantially filled with hydraulic damping fluid, and means for attaching said stator and rotor structures respectively to said parts in a manner to effect relative rotation of said structures upon relative movement of said parts, the improvement comprising:

dividing said working chamber into subchambers by means of axially projecting vanes fixed to an axially inwardly facing surface of said stator structure and cooperating in interdigitated relation with oppositely axially projecting radial vanes fixed to an axially inwardly facing surface of said rotor structure within said chamber;

effecting damping displacement of hydraulic damping fluid at each opposite end of each of said subchambers by moving the fluid across restricted width orifice gaps defined between each of said inwardly facing surfaces and axially facing edge means on respectively the vanes projecting toward each of said surfaces from the other of said surfaces, during relative swinging movements of said vanes in the relative rotary movements of said structures;

and one of said structures having an axial pintle extending through said chamber and slidably through the other of said structures and carrying a threadedly engaged adjustment knob, and operating said knob and thereby axially adjusting said stator and rotor structures relative to one another and thereby axially adjusting the width of said restricted orifice gaps;

so that, by arranging the width of the orifice gaps substantially equally between each of said surfaces and said vane edge means, attaining damping fluid displacement in substantially equally divided stable relation at opposite ends of said subchambers.

7. A method according to claim 6, comprising effecting said restricted orifice gap damping in one relative rotory direction movement of said structures, and permitting relatively free hydraulic damping fluid displacement between said subchambers in the opposite relative rotary movement of said structures.

* * * * *